(12) United States Patent
Kessler et al.

(10) Patent No.: US 6,794,993 B1
(45) Date of Patent: Sep. 21, 2004

(54) ARRANGEMENT FOR TRANSMITTING SIGNALS FROM A DEVICE MONITORING TIRE PRESSURE ON THE WHEELS OF A MOTOR VEHICLE TO AN EVALUATION DEVICE ARRANGED IN A MOTOR VEHICLE

(76) Inventors: Ralf Kessler, Lessingstrasse 12, D-76327 Pfinztal (DE); Andreas Kühnle, Hauptstrasse 25, D-75433 Maulbronn (DE); Roland Michal, Reichsstrasse 23, A-6890 Lustenau (AU); Norbert Normann, Panoramastrasse 12, D-75223 Niefern-Öschelbronn (DE); Lothar Gunter Schulze, Lutherstrasse 3, D-75228 Ispringen (DE)

( * ) Notice: Subject to any disclaimer, the term of this patent is extended or adjusted under 35 U.S.C. 154(b) by 0 days.

(21) Appl. No.: 09/868,006
(22) PCT Filed: Dec. 8, 1999
(86) PCT No.: PCT/EP99/09629
§ 371 (c)(1),
(2), (4) Date: Jul. 26, 2001
(87) PCT Pub. No.: WO00/34061
PCT Pub. Date: Jun. 15, 2000

(30) Foreign Application Priority Data

Dec. 10, 1998 (DE) ......................................... 198 56 898

(51) Int. Cl.⁷ .............................................. G08B 21/00
(52) U.S. Cl. .................. 340/870.16; 340/442; 340/447; 73/146.5
(58) Field of Search ................................ 340/447, 442, 340/825.54, 445; 73/146.4, 146.5; 200/61.22

(56) References Cited

U.S. PATENT DOCUMENTS

| | | | |
|---|---|---|---|
| 5,602,524 A | | 2/1997 | Mock et al. ................. 340/447 |
| 6,362,731 B1 | * | 3/2002 | Lill ............................ 340/445 |
| 6,580,365 B2 | * | 6/2003 | Starkey ...................... 340/447 |
| 6,591,671 B2 | * | 7/2003 | Brown ....................... 73/146.5 |
| 2004/0055370 A1 | * | 3/2004 | Normann et al. ............. 73/146 |

FOREIGN PATENT DOCUMENTS

| | | | |
|---|---|---|---|
| DE | 3029563 | 2/1982 | |
| DE | 4205911 | 9/1993 | |
| DE | 19518806 | * 11/1996 | ........... B60C/23/00 |
| DE | 19608478 | 5/1997 | |
| EP | 0445003 | 9/1991 | |

* cited by examiner

*Primary Examiner*—Timothy Edwards

(57) ABSTRACT

An arrangement for transmitting signals from a device (3) for monitoring the tire pressure in vehicle wheels (1), being arranged in the tire preferably as one module together with a valve, and comprising a pressure sensor arranged for measuring the tire pressure and generating an electric pressure signal, a control circuit, a battery as power source, and a transmitter with a sending antenna for transmitting the measured pressure signal as a radio-frequency (RF) signal under the control of the control circuit to a central evaluation and control unit (8), which is arranged in the vehicle (2) and which is connected to receiving antennas (4), to which individual wheels (1) or groups of wheels (1) of the vehicle (2) are allocated, via a RF receiver which comprises a demodulator and transforms the received RF signals to low-frequency (LF) signals. At each receiving antenna (4), there is arranged a single-channel RF receiver (5) with demodulator (6) so that the electric lines (7) send out LF signals instead of RF signals.

12 Claims, 2 Drawing Sheets

Figure 1:
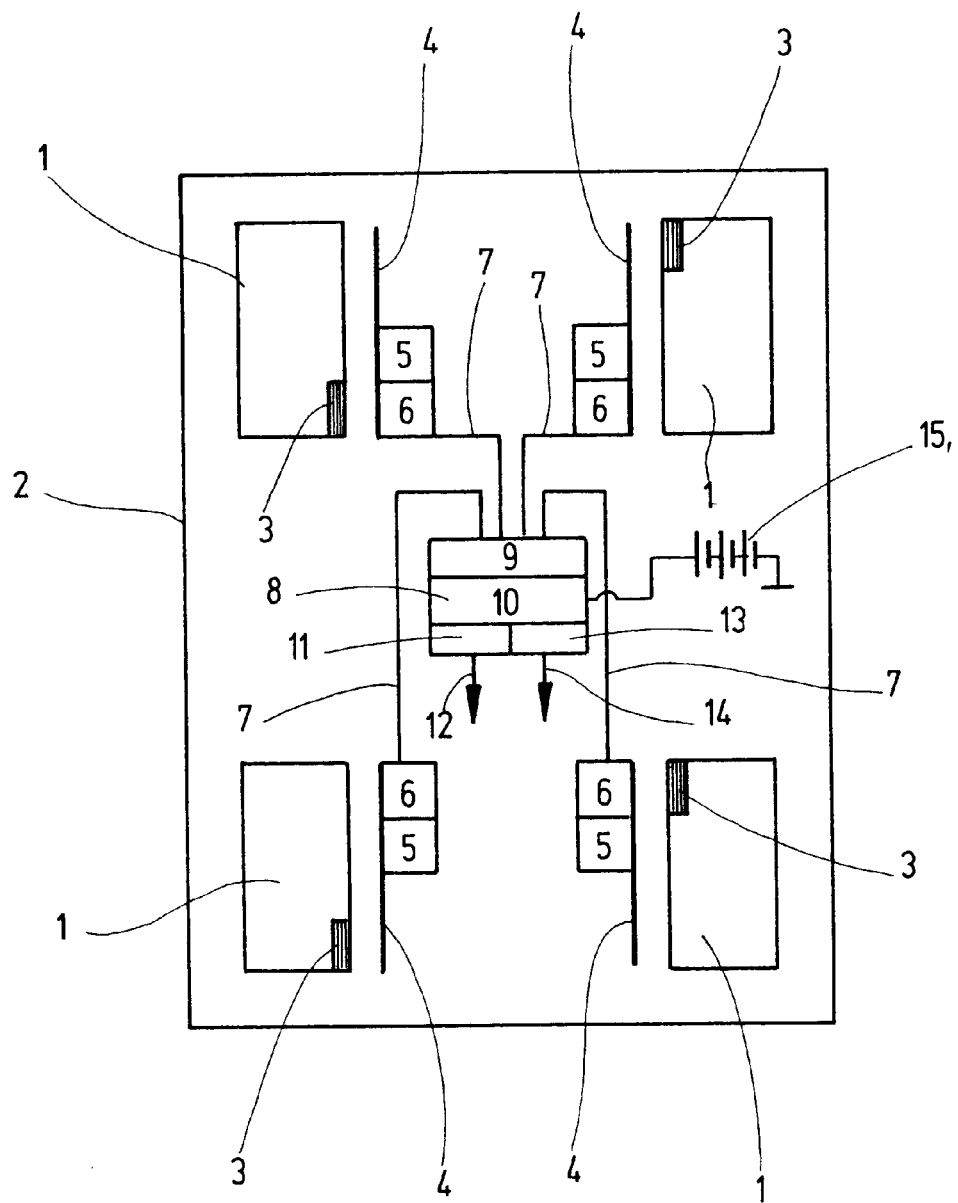

ARRANGEMENT FOR TRANSMITTING SIGNALS FROM A DEVICE MONITORING TIRE PRESSURE ON THE WHEELS OF A MOTOR VEHICLE TO AN EVALUATION DEVICE ARRANGED IN A MOTOR VEHICLE

The present invention proceeds from an arrangement having the features indicated in the preamble of Claim 1. An arrangement of this kind is known from DE 195 18 806 A1, where it is disclosed to monitor the pressure in the tires of a vehicle by means of pressure sensors which latter are arranged, together with a battery-driven electronic measuring and control circuit, a transmitter and a sending antenna, in the valve, on the valve or as one module with the valve of the wheel. This unit, being provided on the respective wheel, will be referred to hereafter also as wheel-mounted electronic module. The electronic tire-pressure signals supplied by the pressure sensor in the respective wheel-mounted electronic module are supplemented by the electronic measuring and control circuit by the respective identification signal, are then transformed to digital radio signals and transmitted by radio to a central receiving, evaluation and control unit, which latter is connected to receiving antennas for this purpose.

Contained in the radio signals as constituents in digital form are a preamble, the identification signal, a tire-pressure signal and a postamble. The radio signals are radio-frequency signals. In Germany, radio-frequency transmission is effected in the 433 MHz range, known as ISM band, in some other countries in the 315 MHz range or the 868 MHz range. The radio signals sent out by the wheel-mounted electronic module are received by the receiving antennas provided for this purpose.

When a separate receiving antenna is allocated to each wheel of the vehicle, it is preferably located in the neighbourhood of the respective wheel, in particular on the wall of the wheel house of the vehicle chassis. However, there is also the possibility to provide a common first antenna for the front wheels and a common second antenna for the rear wheels, which antennas are then located preferably approximately midway between the wheels. The receiving antennas transmit the RF signals via special lines, suited for transmitting RF signals, to the central receiving, evaluation and control unit where a RF receiver, provided with a separate receiving channel for each antenna, amplifies and demodulates the signal arriving at the input of the respective receiving channel. After demodulation, the LF signal then present is decoded and evaluated in order to provide the driver via a control module of the device with a warning, if necessary, or some other information regarding the tire pressure.

Since the wheel-mounted electronic module is battery-driven and the battery is to have a service life of typically seven years, the wheel-mounted electronic module must operate with the least possible current consumption. Its radio signals are, consequently, very weak. Due to the low signal level on the electric lines between the receiving antennas and the central receiving, evaluation and control unit, costly measures are required for the electric lines to protect the signals transmitted via those lines from external interference. In a practical example of a tire-pressure monitoring system according to DE 195 18 806 A1, the electric lines are twisted-pair cables that have been shielded in a costly way.

The safety from interference achievable in this way is only imperfect and connected with considerable cost.

Now, it is the object of the present invention to indicate an approach for making the transmission of the signals more immune to noise, and this in a low-cost way, without however reducing the service life of the battery in the wheel-mounted electronic module.

This object is achieved by a method having the features defined in Claim 1. Advantageous further developments of the invention are the subject-matter of the sub-claims.

According to the invention, the RF receiver with demodulator is no longer arranged at the central evaluation and control unit; instead, there is located at each receiving antenna a RF receiver, now only of the single-channel kind, with a demodulator so that the electronic lines have to transmit LF signals only instead of RF signals. For transmitting LF signals, no expensive shielded cables are required; rather, unshielded electric lines can be used that are available at much lower cost. An additional advantage lies in the fact that the LF signals formed already at the antenna, as a result of the demodulation step, are much less sensitive to interference than the RF signals transmitted via twisted-pair cables according to the state of the prior art.

Preferably, each individual receiving antenna is combined in one module with the allocated single-channel RF receiver with demodulator. This allows the shortest possible line connection between the receiving antenna and the single-channel RF receiver, and is especially favourable where low interference susceptibility is to be achieved.

The single-channel RF receiver must be supplied with voltage from the electric wiring of the vehicle. The voltage supply may be effected via a separate line connecting the electric wiring of the vehicle with the respective RF receiver. Preferably, however, the voltage supply is not effected via separate lines, but rather via the lines anyway provided for transmission of the LF signals from the central evaluation and control unit which in its turn is supplied from the electric wiring of the vehicle. The supply voltage being a direct voltage, the LF signal to be transmitted can be impressed by superimposition.

From DE 196 08 478 A1 it has been known that it is possible, by evaluation of the intensities (received amplitudes) of the radio signals received by the receiving antennas, to determine by means of the central evaluation and control unit the exact location at the vehicle of that wheel whose wheel-mounted electronic module sends out a signal with an individual identifier. If automatic determination of the wheel position by means of the arrangement according to the invention is to be rendered possible, then the central evaluation and control unit must be provided, additionally to the signal which is transmitted to it by radio and then demodulated, with some information regarding the intensity of the signal received by the respective receiving antenna, for example an information regarding the signal field strength received. This information is also described by the abbreviation RSSI in technical terminology (Received Signal Strength Indicator=measure of the received field strength). This can be achieved in different ways:

An analog signal having a strength proportional to the RSSI level of the signal transmitted by radio is produced in the single-channel RF receiver. For generating the analog signal, the signal received is fanned out, and one branch is integrated by a capacitor. The voltage building up at the capacitor then provides a measure of the RSSI level received.

The analog signal is transmitted to the central evaluation and control unit via a separate line as load-independent direct current. Preferably, the analog signal is transmitted via the same electric line by which the demodulated LF signal is transmitted. If in addition the voltage supply of the single-channel RF receiver is to be effected via the same line then the RSSI information cannot be transmitted as direct voltage, the latter being already used as supply voltage from the evaluation and control unit. Rather, the RSSI information may be transmitted in this case as current signal via the jointly used single line from the receiver/demodulator to the central evaluation and control unit where the LF signals and the RSSI signal can be separately evaluated.

On the other hand, the single-channel RF receiver can be suitably designed to locally evaluate the RSSI level of the signals received by radio, to convert the RSSI level to a digital signal and to transmit the latter together with the received digital signal, that has been received and then modulated, to the central evaluation and control unit. Transmission of the digital RSSI signal can be effected either before or after the received demodulated digital signal.

A further advantage of the invention lies in the fact that the assembly formed by the single-channel RF receiver and the demodulator can be suitably designed to generate at one interface the data protocol of a bus system installed in the motor vehicle. Linking the components consisting of receiving antennas, RF receivers and demodulators with the central evaluation and control unit can be effected through the existing bus system. By combining the respective receiving antenna according to the invention with an RF receiver and demodulator, the respective receiving antenna becomes an intelligent RF sensor with bus capability. The central evaluation and control unit can receive its tire-pressure information directly via a bus interface already available and can likewise output its output signals (indicator, diagnosis and control signals) via a bus interface. And the voltage supply of the RF receiver can also be effected via the bus system. A further connection, separate from the bus system, between the receiving antennas and the central evaluation and control unit is rendered superfluous by this development of the invention.

Some exemplary embodiments of the invention are illustrated diagrammatically in the attached drawings. In the illustrated exemplary embodiments, identical parts or parts corresponding one to the other are identified by the same reference numerals.

Figure 2:
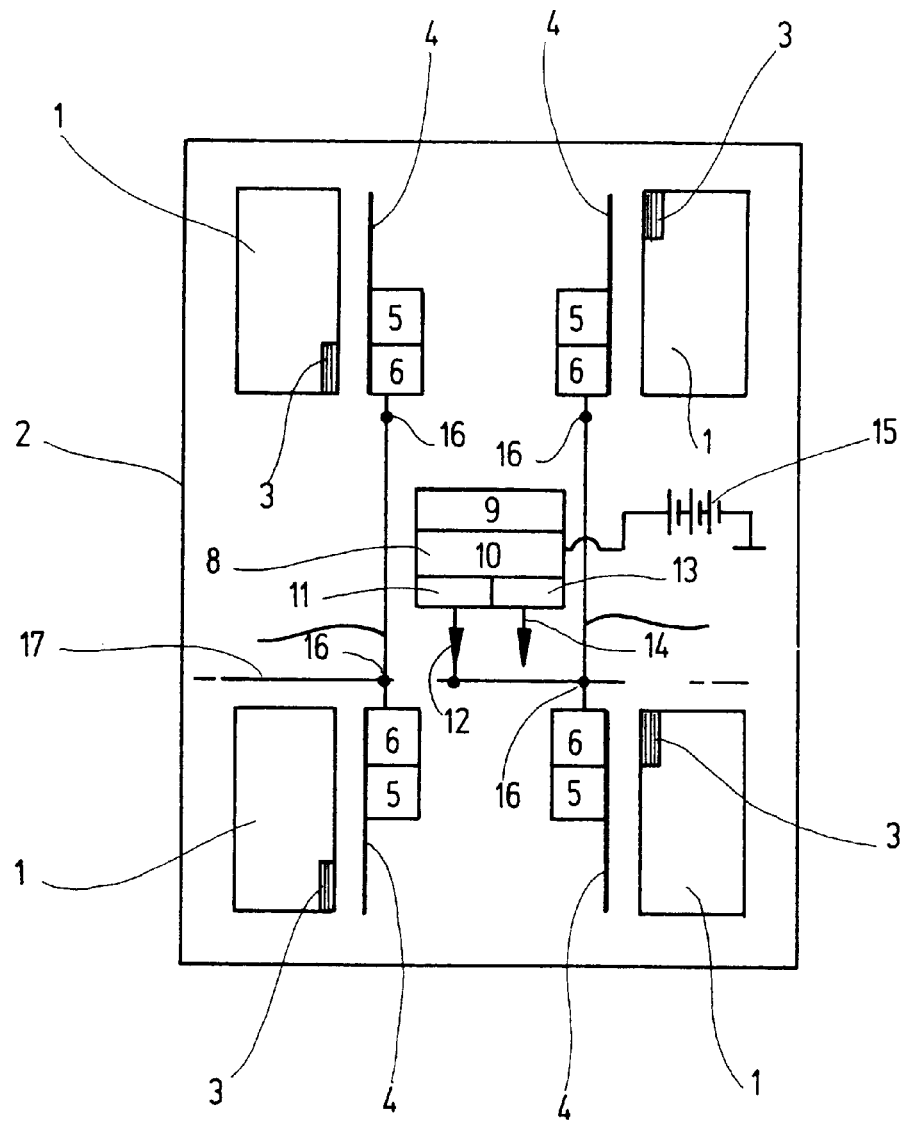

FIG. 1 shows in diagrammatic form a block diagram of the arrangement of the essential components of a tire-pressure monitoring system in a motor vehicle; and FIG. 2 shows a modified connection illustrating a different way of connecting the components of the tire-pressure monitoring system, modified by comparison with FIG. 1, namely using a bus system installed in the motor vehicle.

FIG. 1 shows four wheels 1 of a motor vehicle 2 in diagrammatic representation. Mounted on each wheel 1 is a wheel-mounted electronic module 3. Each wheel-mounted electronic module 3 is implemented as one module with a valve, and is located at the valve base inside the tire of the wheel. The wheel-mounted electronic modules 3 are identical one to the other and have the same mounted positions relative to the respective wheel 1. Each wheel-mounted electronic module 3 comprises (not shown in the drawing) an electric battery, an integrated, preferably piezo-electric pressure sensor with associated measuring and control electronics and a transmitter with RF stage that feeds a sending antenna. The transmitter sends out pressure signals, that have been pikked up by the pressure sensor and processed by the measuring and control electronics, in the form of digital RF signals which additionally contain an identifier characteristic of the respective wheel-mounted electronic module.

Neighbouring each wheel 1, a receiving antenna 4 is provided in the wheel house of the chassis 2 of the motor vehicle, in which the respective wheel is enclosed. Allocated to each receiving antenna 4 is a single-channel RF receiver 5 with demodulator 6 so that the respective receiving antenna 4, the RF receiver 5 and the demodulator 6 form one component which is connected, via an electric line 7, to a central evaluation and control unit 8 that may be located, for example, behind an instrument panel of the motor vehicle 1.

The evaluation and control unit 8 comprises an LF receiver module 9, a microprocessor 10 for evaluation of the signals and for control tasks, a bus driver 11 for a bus interface 12 via which warning signals and other information regarding the tire pressure and signals for the operation arid setting of the evaluation and control unit can be transmitted via a vehicle-specific data bus for display on the instrument panel, as well as a driver 13 for the diagnosis interface 14, The evaluation and control unit 8 is supplied with voltage from the vehicle wiring, symbolized in the drawing by the connection between the evaluation and control unit 8 and a battery 15 of the motor vehicle. The voltage supply of the single-channel RF receiver 5 with the associated demodulators 6 is effected via the evaluation and control unit 8 and via the lines 7 anyway provided for transmitting the LF signals.

The embodiment illustrated in FIG. 2 differs from the embodiment illustrated in FIG. 1 in that the components constituted by a single-channel RF receiver 5 and modulator 6 generate directly at their output interface 16 the data protocol of a bus system 17 installed in the motor vehicle. The evaluation and control unit 8 then receives its information directly via the bus interface 12 already available. A separate connection between the receiving antennas 4 and the evaluation and control unit 8 is rendered superfluous in this case.

Legend

1. Wheels
2. Motor vehicle
3. Wheel-mounted electronic module
4. Receiving antenna
5. RIF receiver
6 Demodulator
7. Electric line
8. Evaluation and control unit
9 LF receiver unit
10. Microprocessor
11. bus driver
12. bus interface
13. Driver
14. Diagnosis interface
15. Battery
16. Output interface
17. bus system

What is claimed is:

1. An arrangement for transmitting signals from a device (3) for monitoring the tire pressure in vehicle wheels (1), being arranged in the tire, and comprising a pressure sensor arranged for measuring the tire pressure and generating an electric pressure signal, a control circuit, a battery as power source, and a transmitter with a sending antenna for transmitting the measured pressure signal as a radio-frequency (RF) signal under the control of the control circuit to a central evaluation and control unit (8), which is arranged in the vehicle (2) and which is connected to receiving antennas (4), to which individual wheels (1) or groups of wheels (1) of the vehicle (2) are allocated, via a RF receiver which comprises a demodulator and transforms the received RF signals to low-frequency (LF) signals, characterized in that there is arranged, at each receiving antenna (4), a single-channel RF receiver (5) with demodulator (6) so that low frequency signals instead of RF signals are transmitted via unshielded electric lines (7).

2. The arrangement as defined in claim 1, characterized in that the electric lines (7) are unshieled.

3. The arrangement as defined in claim 1, characterized in that each receiving antenna (4) and the allocated single-channel RF receiver (5) with demodulator (6) are combined in one module.

4. The arrangement as defined in claim 1, characterized in that the said the single-channel RF frequency receivers (5) are supplied with the voltage required for their operation from the central evaluation and control unit (8) via the electric lines (7) that serve to transmit the LF signals.

5. The arrangement as defined in claim 1, characterized in that the single channel RF receiver (5) is designed to generate a digital signal strength proportional to the received RSSI level and that the RF receiver (5) transmits said digital RSSI signal together with the demodulated digital received signal, containing the tire-pressure information, to the central evaluation and control unit (8) via the respective electric line (7).

6. The arrangement as defined in claim 1, characterized in that the module comprising the single-channel RF receiver (5) and the demodulator (6) is suitably designed to generate at its output interface (16) the data protocol of a bus system (17) installed in the vehicle which transmits the demodulated signals to the central evaluation and control unit (8).

7. The arrangements as defined in claim 1, characterized in that the device (3) for monitoring the tire pressure in a vehicle wheel (1) is arranged in conjunction with a valve in the tire.

8. The arrangement as defined in claim 1, characterized in that the said the single-channel RF receiver (5) is so designed as to generate an analog signal of a strength proportional to the received RSSI level.

9. The arrangement as defined in claim 8, characterized in that the analog signal is a load-independent direct voltage.

10. The arrangement as defined in claim 8, characterized in that the analog signal is a direct voltage.

11. The arrangement as defined in claim 10, characterized in that the analog signal is transmitted to the central evaluation and control unit (8) via a separate line.

12. The arrangement as defined in claim 10, characterized in that the analog signal is transmitted to the central evaluation and control unit (8) via the same line (7) through which the LF signals are transmitted as well.

* * * * *